UNITED STATES PATENT OFFICE.

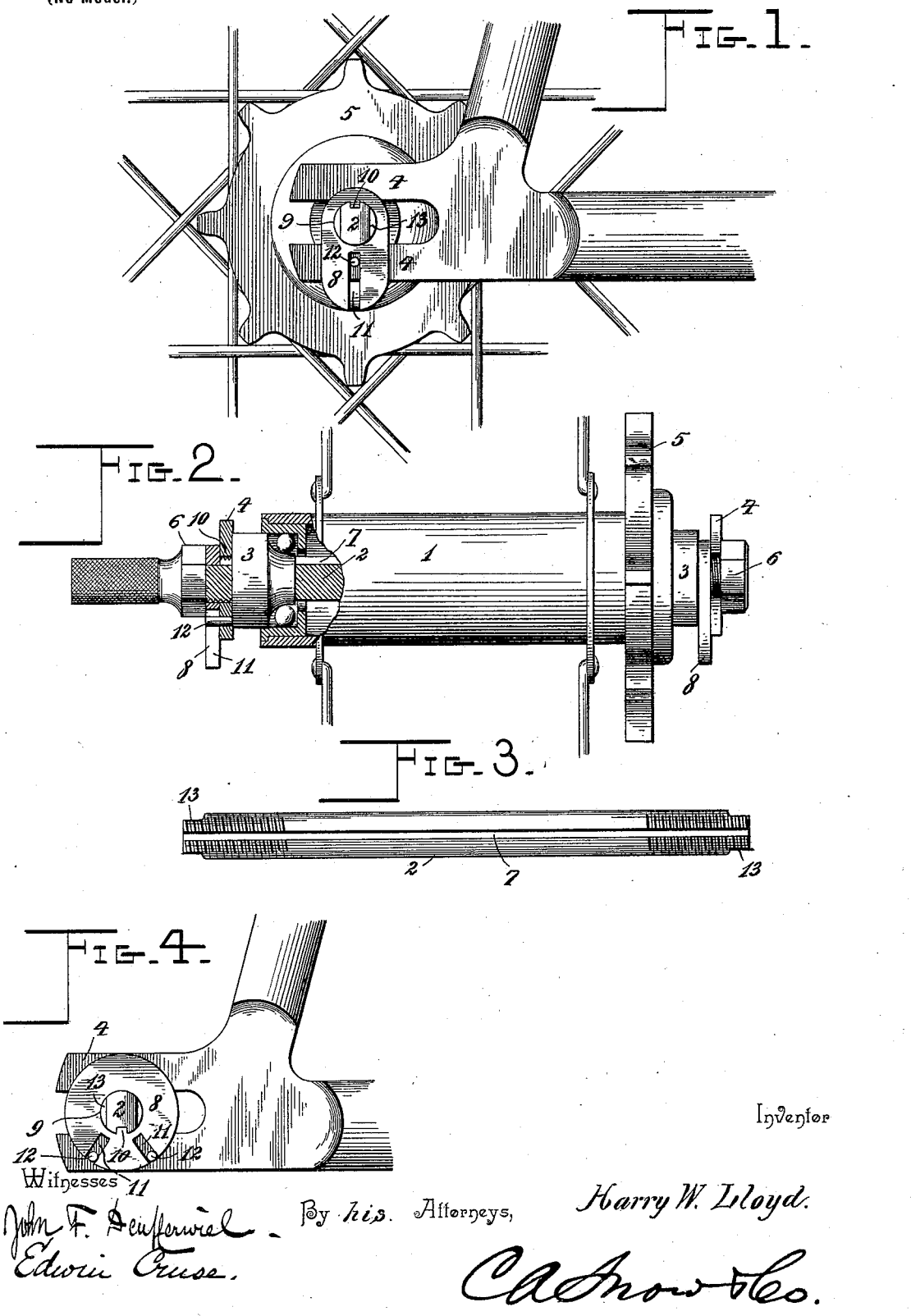

HARRY W. LLOYD, OF WILLIAMSPORT, PENNSYLVANIA.

ADJUSTING MECHANISM FOR BICYCLES.

SPECIFICATION forming part of Letters Patent No. 620,156, dated February 28, 1899.

Application filed August 7, 1897. Serial No. 647,436. (No model.)

*To all whom it may concern:*

Be it known that I, HARRY W. LLOYD, a citizen of the United States, residing at Williamsport, in the county of Lycoming and State of Pennsylvania, have invented a new and useful Adjusting Mechanism for Bicycles, of which the following is a specification.

This invention relates to adjusting mechanism for bicycles, its object being to provide a simple and efficient mechanism to simultaneously and uniformly adjust both ends of the axle of the driving-wheel in their supports when it may be necessary to do so for any purpose, such as tightening or loosening the driving-chain, whereby the axle of the driving-wheel will always be maintained in true parallel relation to the pedal or crank shaft.

With this object in view the invention consists of the several details of construction and combination of parts hereinafter fully described, and particularly pointed out in the claims.

In the drawings, Figure 1 is a side elevation of portions of the rear end of a bicycle-frame and the driving-wheel, showing an application of my invention, the nut on the end of the axle being removed. Fig. 2 is a rear view, partly in section. Fig. 3 is a plan view of the axle. Fig. 4 is a side elevation showing a modified form of the invention.

Similar reference-numerals indicate similar parts in the several figures.

1 indicates the hub of the driving-wheel, and 2 the axle. 3 indicates the collars secured on the axle, with which the inner faces of the forked ends 4 of the frame engage and in which forked ends the axle is supported. 5 indicates the sprocket-wheel, and 6 the clamping-nuts on the ends of the axle. All these parts may be of any ordinary or approved construction and form no part of my invention.

In order to carry out my invention, I provide the axle 2 with a longitudinal slot 7. As shown in the drawings, the slot extends from end to end of the axle, and this will be the preferred form, since it will be easier to cut the slot continuously, although the slot in the middle portion of the axle is not necessary. 8 indicates a plate or arm which, as shown in Figs. 1 and 2, is oblong in form and is provided with an opening 9 at one end to fit over the end of the axle 2. A radial lug 10 projects inwardly in this opening and is adapted to seat in the slot 7 in the axle. At the other end of the plate 8 an open-ended elongated slot 11 is formed in axial alinement with the radial lug 10. This slot is intended to receive a pin 12, which will be fitted in any suitable manner in one of the fork members 4. The ends of the axle are flattened on opposite sides, as indicated at 13, to provide a wrench-engaging surface, in order that the axle may be turned axially in its supports.

Assuming the parts to be in the position shown in Fig. 1, if it is desired to tighten the driving-chain the clamping-nuts 6 will be loosened or removed in order to enable a wrench to be applied to one or both of the flattened portions of the axle and the latter will be turned axially, and by reason of the engagement of the lug 10 in the slot 7 the plate 8 would have a tendency to swing forward at its lower end; but by reason of the engagement of the pin 12 in the slot 11 this forward movement of the lower end is prevented and the upper end of the washer, and with it the axle, will be forced to move rearwardly in the fork 4, and this movement will be uniform and simultaneous at both ends of the axle, as will be readily understood. It will be seen that the adjustment of the axle can be easily and quickly accomplished and that it will be uniform at both ends, and consequently the axle will always maintain a true parallel relation with the shaft of the pedal-crank and the driving-wheel will necessarily run true. The axle will be firmly held in its adjusted position by means of the clamping-nuts 6.

Referring to Fig. 4, the plate or arm 8 is in the form of a disk and is provided with a central opening to fit over the axle and with two elongated radial open-ended slots 11, and two pins 12 are secured in one of the arms of the fork 4. In this figure the slots 11 radiate from the axial center of the disk and the axle. The operation of this device is the same as that already described; but in turning the axle on its axis in either direction one of the pins 12 will become disengaged from its slot, while the other pin will tend to force the axle in the desired direction.

In each of the forms illustrated it will be seen that the plate 8 is keyed to the axle and has a fulcrumed connection with the side of the fork end of the frame, which connection restricts the rotary movement of the plate when the axle is rotated and forces the axle to move laterally at the same time it is turned axially in its supports.

It will be understood that changes in the form, proportion, and the minor details of construction may be resorted to without departing from the spirit or sacrificing any of the advantages of this invention.

Having thus described the invention, what I claim is—

1. The combination with the rear forked or slotted end of a bicycle-frame, of the rear-wheel axle or spindle adjustable within said frame fork or slot, and provided at each end with an arm connected with the frame by a slot and laterally-projecting bearing or pin, whereby the turning of the axle will produce a backward or forward movement of the same within the slots of the frame, substantially as described.

2. In an adjusting mechanism for bicycles, the combination with the forked end of the frame, and the rear-wheel axle adjustable therein, of a plate or arm fitted to each end of the axle and provided with a pair of spaced radially-disposed slots, and a pair of fixed bearing-pins projected laterally from the frame adjacent to each plate or arm and respectively engaging the separate slots of the latter, whereby the turning of the axle will produce a backward or forward movement of the same within the slots of the frame, substantially as set forth.

In testimony that I claim the foregoing as my own I have hereto affixed my signature in the presence of two witnesses.

HARRY W. LLOYD.

Witnesses:
   THOS. A. DAVIES,
   ABRAHAM MEYER.